United States Patent
Olson et al.

(10) Patent No.: US 12,359,440 B2
(45) Date of Patent: Jul. 15, 2025

(54) GUARD RAIL BASE AND METHODS ASSOCIATED THEREWITH

(71) Applicant: GARLOCK SAFETY SYSTEMS, INC., Plymouth, MN (US)

(72) Inventors: Robert James Olson, Medina, MN (US); Brian Thomas Simmons, Plymouth, MN (US); Richard B. Stoffels, Eden Prairie, MN (US)

(73) Assignee: GARLOCK SAFETY SYSTEMS, INC., Plymouth, MN (US)

( * ) Notice: Subject to any disclaimer, the term of this patent is extended or adjusted under 35 U.S.C. 154(b) by 0 days.

(21) Appl. No.: 18/628,922

(22) Filed: Apr. 8, 2024

(65) Prior Publication Data

US 2024/0263455 A1 Aug. 8, 2024

Related U.S. Application Data

(62) Division of application No. 17/218,265, filed on Mar. 31, 2021, now Pat. No. 11,976,468.

(60) Provisional application No. 63/131,182, filed on Dec. 28, 2020, provisional application No. 63/003,400, filed on Apr. 1, 2020.

(51) Int. Cl.
*E04F 11/18* (2006.01)
*B62B 1/06* (2006.01)
*B62B 1/26* (2006.01)
*E04H 12/22* (2006.01)

(52) U.S. Cl.
CPC ............ *E04F 11/1814* (2013.01); *B62B 1/06* (2013.01); *E04H 12/2261* (2013.01); *B62B 1/264* (2013.01)

(58) Field of Classification Search
CPC ......... B62B 1/06; B62B 1/264; B62B 5/0093; B62B 3/04; E04H 12/2261; E04G 5/001; E04F 11/1814
See application file for complete search history.

(56) References Cited

U.S. PATENT DOCUMENTS

| | | | |
|---|---|---|---|
| 11,214,971 B1 * | 1/2022 | MacKarvich | E04G 21/3223 |
| 2008/0237560 A1 * | 10/2008 | Dehlsen | E01F 9/692 |
| | | | 256/65.14 |
| 2014/0217345 A1 * | 8/2014 | Stoffels | B60R 3/005 |
| | | | 256/64 |

* cited by examiner

*Primary Examiner* — Gisele D Ford
(74) *Attorney, Agent, or Firm* — Best & Flanagan LLP

(57) ABSTRACT

The top surface of an insert abuts with a form, with a tube extending into an aperture and sliding on a form post in the form. A rod inserted through the form, form post and tube holds the insert in place while castable material is poured in. The form is inverted with the guard rail base inside, the rod can be slid out of the form, and the form is removed. The handle is gripped by a claw on the obtuse angled chassis of a transporter. A handle on the chassis can be pushed to raise the guard rail base and to move the guard rail base on the surface by wheels. The guard rail base can be placed upon a pad having notches in its border.

11 Claims, 5 Drawing Sheets

GUARD RAIL BASE AND METHODS ASSOCIATED THEREWITH

CROSS-REFERENCE TO RELATED APPLICATIONS

The present disclosure is a divisional application of U.S. application Ser. No. 17/218,265, filed on Mar. 31, 2021, which claims priority to Provisional Application No. 63/131,182, filed Dec. 28, 2020, and which claims priority to Provisional Application No. 63/003,400, filed Apr. 1, 2020, entitled "Guard Rail Base and Methods Associated Therewith", the contents of which are hereby incorporated by reference herein in their entirety.

BACKGROUND

A guard rail base and methods associated therewith are shown and described.

There are circumstances where it is desirable to position a guard rail around an area, such as at the perimeter of a roof. This is accomplished by fixing panels to bases. Prior bases were difficult to position, were relatively undesirably easy to be pushed when fixed to panels, and were relatively expensive to fabricate. Thus, a need exists for an improved guard rail base and methods associated therewith.

SUMMARY

This need and other problems in the field of placement of guard rails are solved by providing a novel guard rail base and methods associated therewith. Particularly, an insert includes a plate, a tube extending through the plate, and a handle and an anchor fixed on opposite sides of the plate. The top surface of the plate abuts with the base of a form while the tube extends into and is located in an aperture in the form and slides on a form post. A rod inserted through the form, the form post, and the tube holds the insert in place in the form while castable material is poured into the form. After the castable material hardens, the form is inverted with the guard rail base inside, with the rod holding the ground rail base in the form while being inverted. Then, the rod can be slid out of the form, and the form is removed. The guard rail base can be gripped by a claw on the obtuse angled chassis of a transporter. A handle on the chassis can be pushed to raise the guard rail base about wheels on the chassis and to move the guard rail base on the surface by the wheels. The guard rail base can be placed upon a pad having notches in its border. In the form shown, the tube has circular cross sections and is configured to slideably receive a panel post of a panel. A plurality of upper openings extend through the tube parallel to and spaced from the top surface and is configured to slideably receive a pin for locking the panel post in the tube. A hole in the body of the guard rail base, created by the rod being slid out of the body, is aligned with a lower opening in the tube. The handle is of a U-shape and includes a handlebar that can be gripped by a transporter such that the guard rail base can be raised from and moved along a surface by a transporter. The anchor is formed by an extension extending parallel to the plate and fixed to the tube. A leg of the handle extends through the plate and is fixed to the extension.

Illustrative embodiments will become clearer in light of the following detailed description in connection with the drawings.

DESCRIPTION OF THE DRAWINGS

The illustrative embodiments may best be described by reference to the accompanying drawings where.

Figure 1:
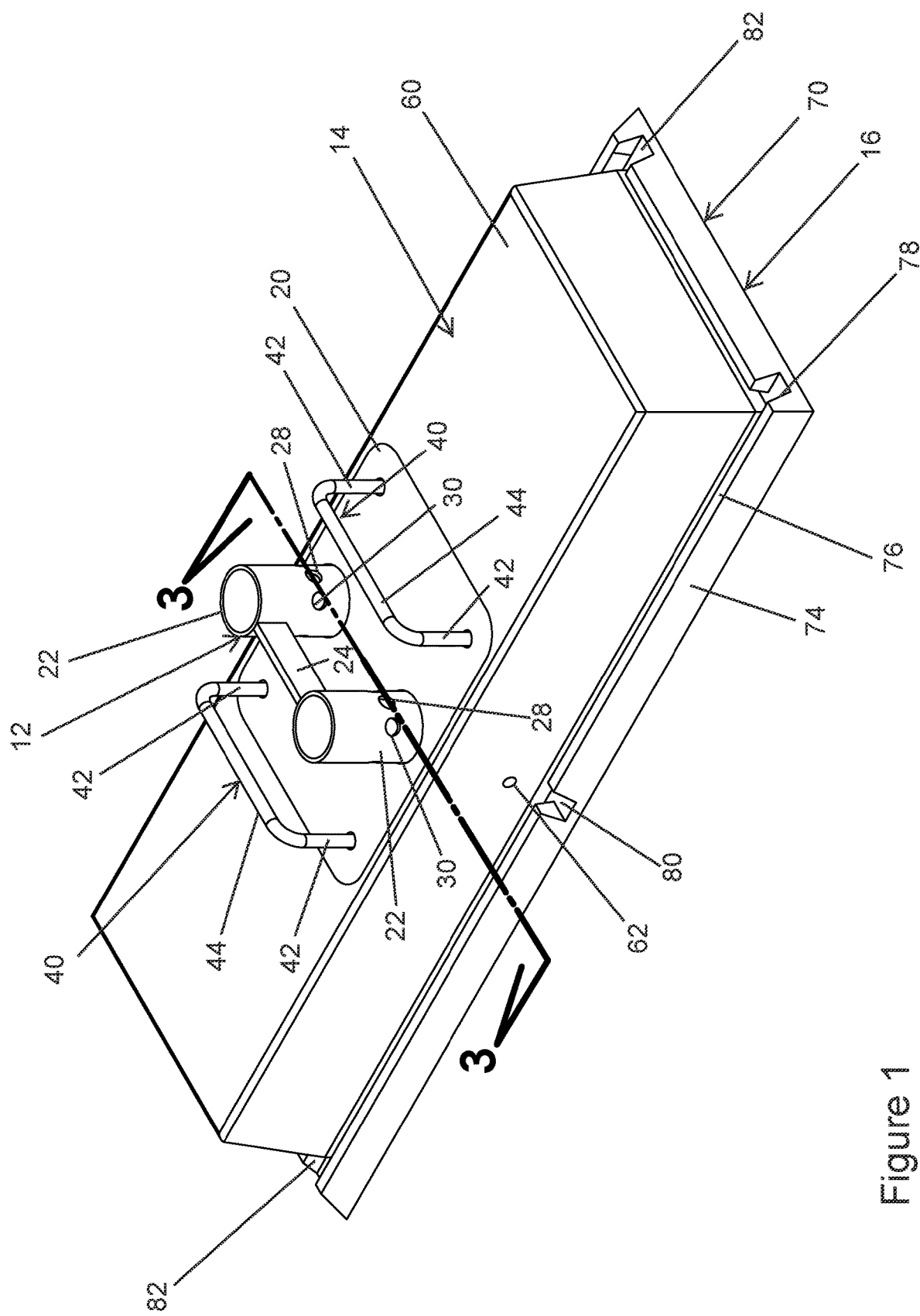
FIG. 1 shows a perspective view of a guard rail base.
Figure 2:
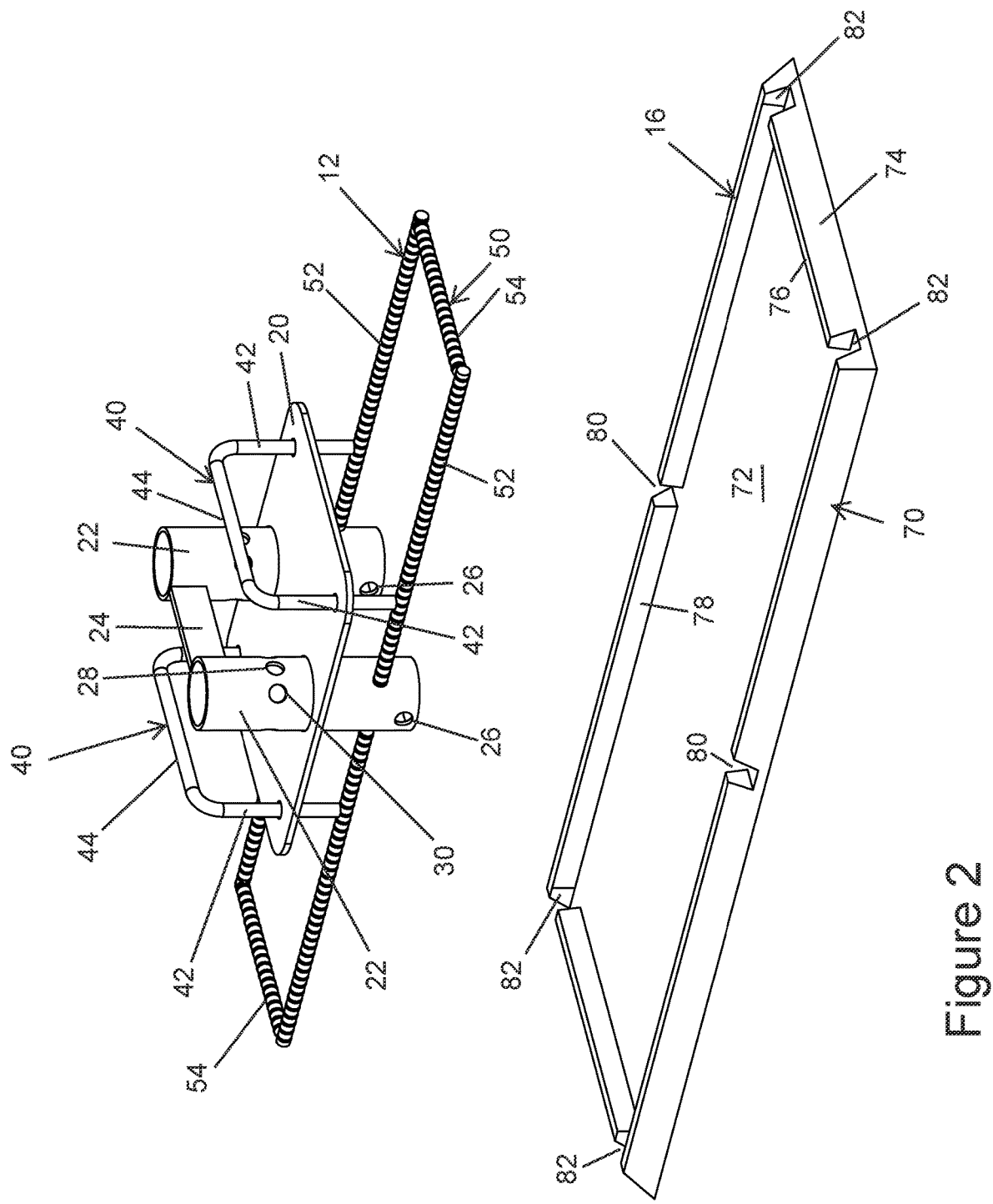
FIG. 2 shows an exploded perspective view of components of the guard rail base of FIG. 1.
Figure 3:
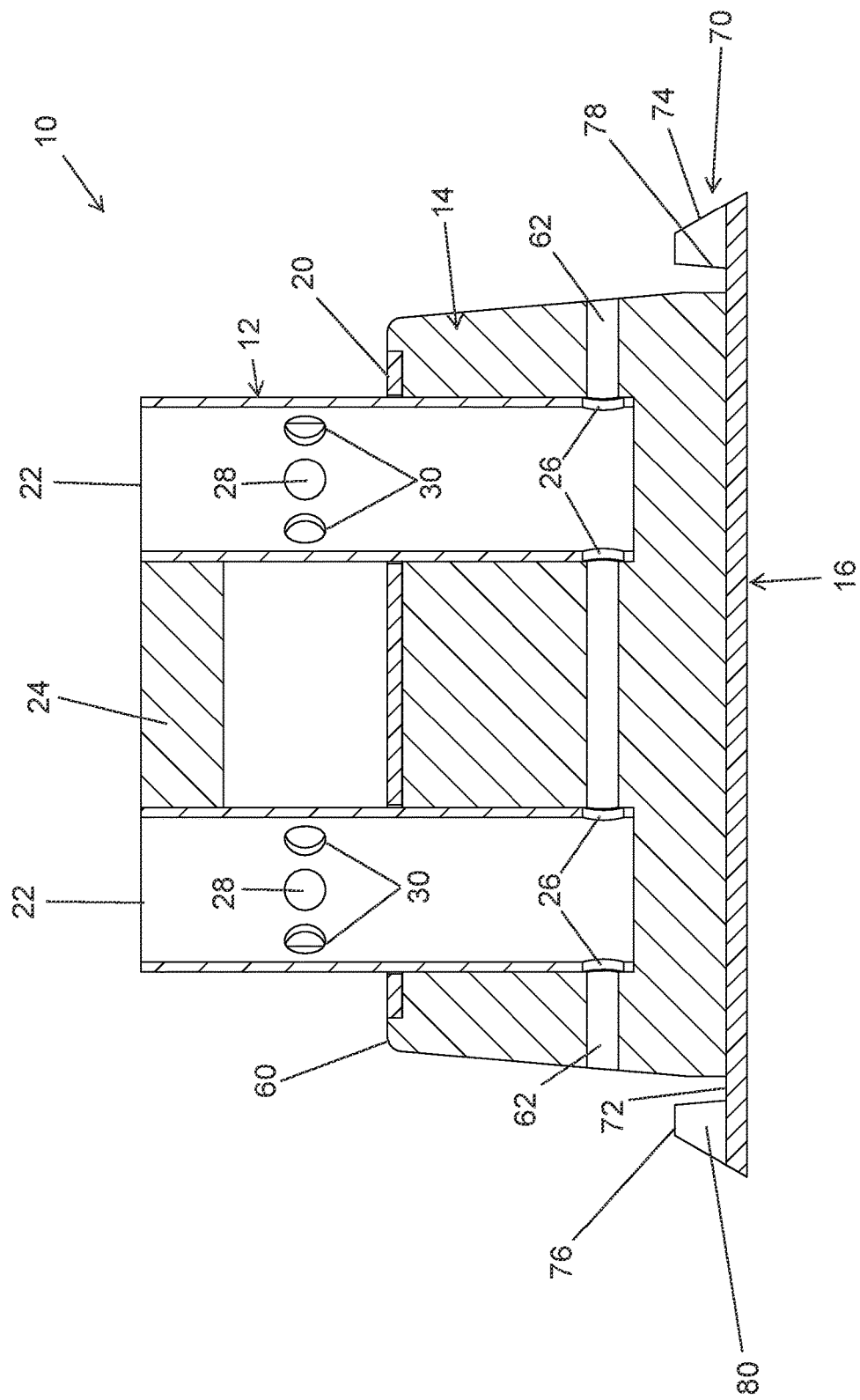
FIG. 3 shows a cross sectional view of the guard rail base of FIG. 1 according to section line 3-3 of FIG. 1.
Figure 4:
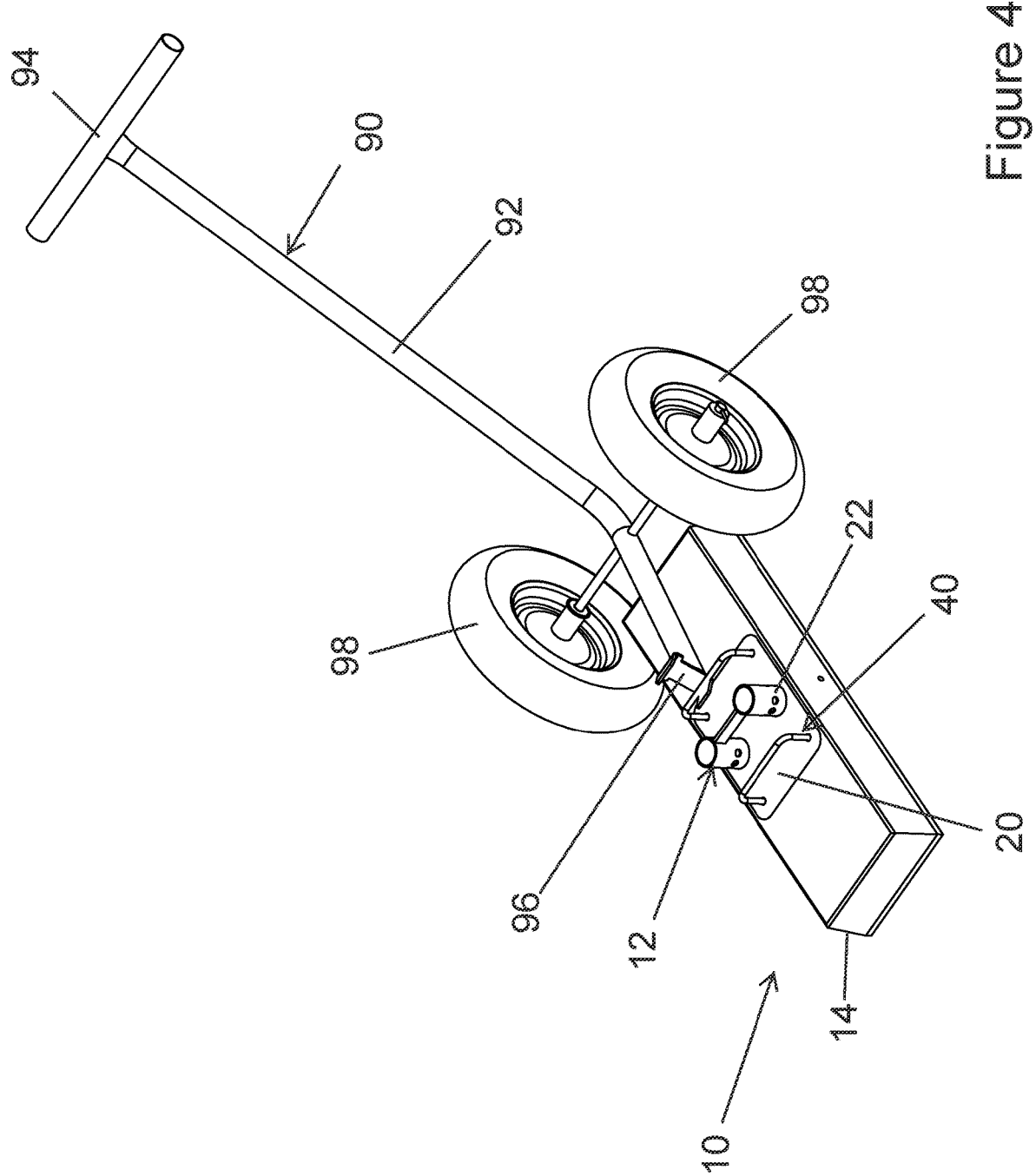
FIG. 4 shows a perspective view of the guard rail base of FIG. 1 being carried by a transporter.
Figure 5:
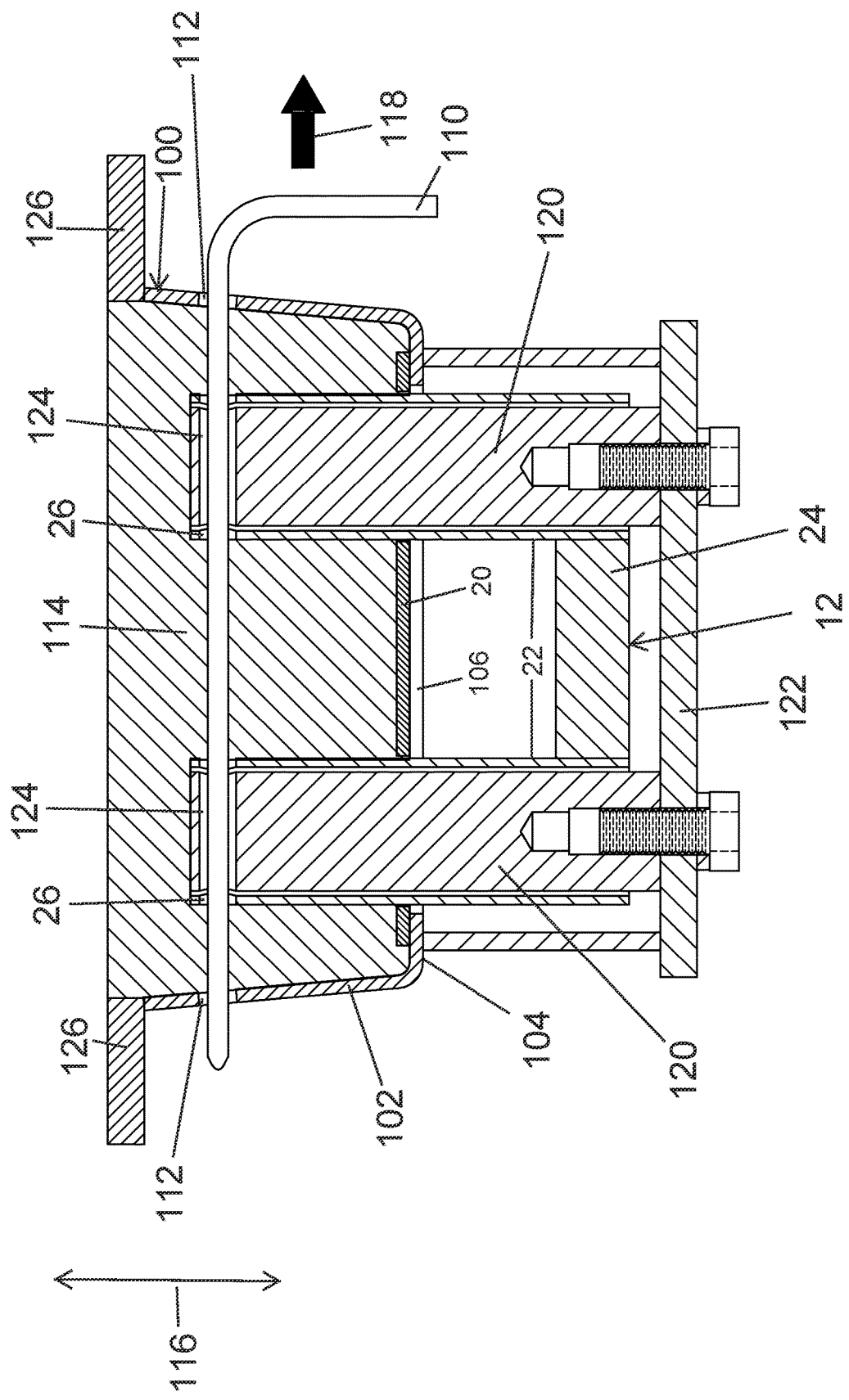
FIG. 5 shows a diagrammatic cross sectional view illustrating the method of forming the guard rail base of FIG. 1.

All figures are drawn for ease of explanation of the basic teachings of the present invention only; the extensions of the figures with respect to number, position, relationship, and dimensions of the parts to form the illustrative embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "forward", "rearward", "reverse", "front", "back", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiments.

DESCRIPTION OF THE ILLUSTRATIVE EMBODIMENTS

A guard rail base is shown in the drawings and generally designated 10. Generally, guard rail base 10 includes an insert 12 and a body 14 in which insert 12 is embedded. Guard rail base 10 is placed upon a pad 16.

Insert 12 generally includes a plate 20 of a rectangular, flat shape having sides and ends extending perpendicular between the sides, with the sides being elongated relative to the ends. Plate 20 includes arcuate corners between the sides and ends, a top surface, and a bottom surface. First and second tubes 22 extend perpendicularly through the top and bottom surfaces of plate 20 and are centered along a center line extending on plate 20 parallel to and equally spaced from the two ends of plate 20. Each tube 22 is equally spaced from a corresponding side of plate 20, with the spacing between tubes 22 along the center line being a multiple of times greater than the spacing from the corresponding side. A bar 24 extends between the upper ends of tubes 22 spaced from and parallel to plate 20. Openings 26 extend through tubes 22 spaced from and parallel to plate 20 and on opposite ends of tubes 22 from bar 24. Openings 26 extend parallel to and spaced from the center line. Two openings 28 extend through each tube 22 generally perpendicular to the center line, and four openings 30 extend through each tube 22 at a 45° angle to the center line. Openings 28 and 30 extend parallel to and spaced from plate 20 and are intermediate and spaced from plate 20 and bar 24. Each tube 22 has circular cross sections and is configured to slideably receive a panel post of a panel. Openings 28 and 30 are configured to receive a pin extending through the panel post to lock the post in tube 22.

Insert 12 further generally includes first and second handles 40 each of a generally U-shape. Particularly, each handle 40 includes first and second legs 42 extending from opposite ends of a handlebar 44, with the interconnection between legs 42 and handlebar 44 being arcuate. Handlebar 44 is arranged generally parallel to and spaced from the top surface of plate 20 and extend generally parallel to and spaced intermediate the center line and a corresponding end of plate 20. Legs 42 extend generally perpendicularly through and are fixed to plate 20. Handles 40 extend from the top surface of plate 20 opposite to the bottom surface of plate 20 and are spaced from first and second tubes 22 in a direction parallel to the sides of plate 20.

An anchor 50 is fixed to plate 20 by being connected to handles 40 and tubes 22. Anchor 50 is spaced from the bottom surface of plate 20 opposite to the top surface of plate 20. In the form shown, anchor 50 includes first and second extensions 52 connected to and extending generally perpendicular to legs 42 and extending generally perpendicular to the center line. Extensions 52 are generally parallel to and spaced from plate 20 and are fixed to tubes 22. Connections 54 extend generally perpendicular between the outer ends of extensions 52. In the form shown, handles 40 are tubular in form, and anchors 50 are formed from re-rod. In the form shown, insert 12 is formed of metal, with components thereof welded together.

Body 14 is formed of concrete or other hardened castable material with insert 12 partially embedded therein. Specifically, body 14 includes a top face 60 with plate 20 embedded therein with the top surface of plate 20 being flush with top face 60 and concentric to the outer edges of top face 60. Anchors 50 are embedded inside body 14 with extensions 52 and connectors 54 located spaced from and parallel to top face 60. A hole 62 extends through body 14 between the side faces thereof and aligned with openings 26 of tubes 22 and generally parallel to and spaced from the center line. Hole 62 and openings 26 provide a drain path for water which gets into tubes 22 such as from rain or snow.

Pad 16 is formed of flexible material such as rubber and of a size larger than the periphery of body 14. Pad 16 includes an upright border 70 extending around the periphery of a top planar surface 72. Specifically, border 70 includes an outer edge 74 extending inwardly at an acute angle to top planar surface 72 and terminating in a top edge 76 which is parallel to and spaced from top planar surface 72. An inner edge 78 extends between top edge 76 and top planar surface 72 and has a shape for receipt concentrically spaced around and for covering the bottom face of body 14. Notches 80 and 82 are formed in border 70, with the bottom of notches 80 and 82 being planar and contiguous with top planar surface 72. Notches 80 are positioned equidistant between the ends of pad 16 and correspond to and align with hole 62 of body 14. Notches 82 are positioned at the ends of the end portions of border 70 adjacent to the side portions of border 70. Notches 80 and 82 act as drainage slots which extend the functionality of pad 16. Pad 16 provides a non-slip and non-moving contact with the surface upon which guard rail base 10 is placed.

In use, handle(s) 40 can be grasped or gripped to carry and place guard rail base 10 at any desired position. As an example, guard rail base 10 can be moved utilizing a transporter 90. In the form shown, transporter 90 includes a chassis 92 having an obtuse angle shape with a handle 94 at one end of a first arm and a claw 96 at another end of a second arm for gripping handle 40. Wheels 98 are connected on opposite sides of chassis 92 at the interconnection of the first and second arms of chassis 92 interconnected at an obtuse angle for movably supporting transporter 90 and guard rail base 10 carried thereby on the surface. Particularly, after grasping, handle 94 is pushed downwards toward the surface to raise guard rail base 10 gripped by claw 96 above the surface. While being pushed downwards, handle 96 is pushed forward to moveably support guard rail base 10 gripped by claw 96 on the surface by wheels 98. When positioning, pad 16 is placed in the desired position, and guard rail base 10 is placed on pad 16. It should be appreciated that the lack of a hole perpendicular to openings 28 prevents the installer placing the sides of insert 12 parallel to a roof edge. Once positioned, the panel post of a panel can be slid into a desired tube 22, and a locking pin can be slid into openings 28 or 30 and through the panel post for locking the panel post to guard rail base 10 for holding the panel in position.

When manufacturing, insert 12 is placed in a form 100 including annular sidewall 102 extending around a base 104. Sidewall 102 terminates in a flange 126 opposite to base 104 and extending parallel to and spaced from base 104. An aperture 106 extends through base 104 and is located within and spaced from sidewall 102. First and second form posts 120 upstand from a stand 122 of form 100 and extend into and through aperture 106. Each form post 120 includes a post opening 124 adjacent its upper free end. Tubes 22 are slideably received on form posts 120, and the top surface of plate 20 abuts with the upper face of base 104 of form 100. Tubes 22, bar 24, and handles 40 extend into aperture 106 in base 104 of form 100. A rod 110 is inserted through form openings 112 in sidewall 102, through openings 26 of tubes 22 and through post openings 124 of form posts 120. Tubes 22 and anchors 40 are positioned in form 100 when concrete or other embedding, castable material is poured into form 100, with rod 110 holding insert 12 in position in form 100 while castable material 114 is poured into form 100. After castable material 114 hardens in form 100, form 100 including hardened castable material 114 and insert 12 are inverted end over and end in a motion 116, while rod 110 holds hardened castable material 114 in form 100 when form 100 is inverted to an upright position. After inverting, rod 110 is gripped and slid in a slide direction 118 out of form openings 112, post openings 124, and openings 66 and out of form 100. After rod 110 is removed, form 100 is removed from hardened castable material 114 and insert 12. Body 14 in which insert 12 is embedded can then be placed on pad 16.

It should be appreciated that the shapes and forms of elements of guard rail base 10 are illustrative and can be modified as desired. As an example, handles 40 and anchors 50 can take other forms and shapes which can be utilized to carry guard rail base 10 and hold insert 12 in body 14.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A guard rail base comprising:
    an insert including a plate having a top surface and a bottom surface;
    a first tube extending through the plate and extending perpendicular to the top surface;
    a first handle fixed to the plate and extending from the top surface opposite to the bottom surface and spaced from the first tube;
    an anchor fixed to the plate and spaced from the bottom surface opposite to the top surface; and a body abutting with the bottom surface of the plate, the body having a periphery and a lower face opposite to the bottom surface, wherein the first tube has a circular cross section and is configured to slideably receive a panel post of a panel, the first tube has a lower opening extending through the first tube parallel to the top surface and spaced from the bottom surface opposite to the top surface and a plurality of upper openings extending through the first tube parallel to the top surface and spaced from the top surface opposite to the bottom surface, the plurality of upper openings are circumferentially spaced around the tube, the plurality of upper openings are configured to slideably receive a pin to lock the panel post in the first tube, the anchor is embedded in the body, and a hole extends through the body and is aligned with the lower opening.

2. The guard rail base of claim 1, wherein the plate is of a rectangular, flat shape and having sides and ends extending generally perpendicular between the sides, with the sides being elongated relative to the ends, and with the hole extending between the sides and equidistant between the ends.

3. The guard rail base of claim 2, wherein each handle is of a U-shape and includes first and second legs extending from opposite ends of a handlebar arranged parallel to and spaced from the top surface, with the first and second legs fixed to the top plate.

4. The guard rail base of claim 3, wherein the anchor comprises a first extension extending in a direction parallel to the plate and fixed to the first tube spaced from and intermediate to the bottom surface and the lower opening, with the first leg of the first handle extending through the plate and fixed to the first extension.

5. The guard rail base of claim 4, further comprising, in combination: a pad of a size larger than the periphery and including a top planar surface, with the pad including a border extending upwardly from the top planar surface, with the bottom face of the body supported upon the top planar surface with the border spaced from the periphery; and a notch in the border and aligned with the hole.

6. The guard rail base of claim 5, wherein the border includes an outer edge extending inwardly at the acute angle to the top planar surface and terminating in a top edge extending parallel to and spaced from the top planar surface, and wherein the border further includes an inner edge extending between the top edge and the top planar surface, with the border extending concentrically around the periphery.

7. The guard rail base of claim 6 further comprising, in combination: a second tube extending through the plate and extending parallel to and spaced from the first tube and perpendicular to the top surface; and a bar extending between the first and second tubes spaced from and parallel to the plate opposite to the bottom surface, with the lower opening of the second tube aligned with the hole and with the lower opening of the first tube.

8. The guard rail base of claim 7, wherein the anchor further comprises a second extension extending in a direction parallel to the plate and fixed to the second tube spaced from and intermediate to the bottom surface and the lower opening and parallel to and spaced from the first extension, with the second leg of the first handle extending through the plate and fixed to the second extension.

9. The guard rail base of claim 8 further comprising, in combination: a second handle fixed to the plate and extending from the top surface opposite to the bottom surface and spaced from the first and second tubes, with the first and second legs of the second handle extending through the plate and fixed to the first and second extensions respectively, with the anchor further including first and second connections extending between opposite ends of the first and second extensions and located on opposite sides of the first and second tubes.

10. The guard rail base of claim 3 further comprising, in combination: a transporter comprising a chassis including first and second arms interconnected at an obtuse angle at an interconnection, a transport handle at an end of the first arm opposite to the interconnection and configured for grasping by a user, a claw at an end of the second arm opposite to the interconnection and configured for gripping the first handle; and wheels connected on opposite sides of the chassis at the interconnection, with the wheels configured to moveable support the transporter, the insert and the body on a surface.

11. The guard rail base of claim 1 further comprising, in combination: a second tube extending through the plate and extending parallel to and spaced from the first tube and perpendicular to the top surface; and a bar extending between the first and second tubes spaced from and parallel to the plate opposite to the bottom surface, with the lower opening of the second tube aligned with the hole and with the lower opening of the first tube.

* * * * *